United States Patent
Siddiqui et al.

(10) Patent No.: US 10,821,821 B1
(45) Date of Patent: Nov. 3, 2020

(54) HYBRID/ELECTRIC VEHICLE TRANSMISSION

(71) Applicant: Ford Global Technologies, LLC, Dearborn, MI (US)

(72) Inventors: Siraj Siddiqui, Lasalle (CA); Cyrille Goldstein, Ferndale, MI (US); Michael Coury, Farmington Hills, MI (US); William David Guarino, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 16/396,912

(22) Filed: Apr. 29, 2019

(51) Int. Cl.
*H02K 5/15* (2006.01)
*B60K 6/405* (2007.10)
*B60K 1/04* (2019.01)
*H02K 1/18* (2006.01)

(52) U.S. Cl.
CPC ............... *B60K 6/405* (2013.01); *B60K 1/04* (2013.01); *H02K 1/18* (2013.01)

(58) Field of Classification Search
CPC .................................. H02K 5/15; H02K 7/006
See application file for complete search history.

(56) References Cited

U.S. PATENT DOCUMENTS

| | | | | |
|---|---|---|---|---|
| 3,344,291 A * | 9/1967 | Pratt | ...................... | H02K 7/145 310/50 |
| 3,476,960 A * | 11/1969 | Rees | ........................ | B25F 5/02 310/50 |
| 3,693,035 A * | 9/1972 | Ostwald | ................. | H02K 1/185 310/51 |
| 3,699,366 A * | 10/1972 | Wood | ..................... | H02K 7/145 310/50 |
| 5,172,006 A * | 12/1992 | Suzuki | ..................... | B60K 6/26 290/45 |
| 5,796,195 A * | 8/1998 | Miyakawa | ............... | B60K 6/26 310/68 B |
| 8,097,997 B2 * | 1/2012 | Mizuno | ................... | B60L 50/61 310/216.131 |
| 2019/0036416 A1 | 1/2019 | Yamagishi et al. | | |

FOREIGN PATENT DOCUMENTS

JP          3285479 B2     5/2002
JP       2017-060247 A     3/2017

* cited by examiner

*Primary Examiner* — Dang D Le
(74) *Attorney, Agent, or Firm* — David Kelley; Brooks Kushman P.C.

(57) ABSTRACT

A vehicle transaxle includes a housing, an electric machine stator, a plurality of mounting plates, and a first set of fasteners. The housing has internal walls that define a cavity and an access opening to the cavity. The electric machine stator is disposed within the cavity between a first of the internal walls and the opening. The plurality of mounting plates secures a first longitudinal end of the stator to the housing proximate the opening. Each fastener of the first set of fasteners extends through one of the mounting plates, through the stator, and engages the first of the internal walls to secure a second longitudinal end of the stator to the first of the internal walls.

14 Claims, 4 Drawing Sheets

HYBRID/ELECTRIC VEHICLE TRANSMISSION

TECHNICAL FIELD

The present disclosure relates to transmissions for hybrid/electric vehicles that include an electric machine such as a motor, generator, or combination motor/generator.

BACKGROUND

Hybrid and/or electric vehicles may include electric machines that are disposed within a housing, such as a transmission or transaxle housing.

SUMMARY

A vehicle transaxle includes a housing, an electric machine stator, a plurality of mounting plates, and a first set of fasteners. The housing has internal walls that define a cavity and an access opening to the cavity. The electric machine stator is disposed within the cavity between a first of the internal walls and the opening. The plurality of mounting plates secures a first longitudinal end of the stator to the housing proximate the opening. Each fastener of the first set of fasteners extends through one of the mounting plates, through the stator, and engages the first of the internal walls to secure a second longitudinal end of the stator to the first of the internal walls.

A vehicle transmission includes a housing, a stator, mounting plates, and a first set of fasteners. The housing has internal rear and side walls that define a cavity. The housing has an outer wall that defines an opening to the cavity. The stator is disposed within the cavity. The mounting plates secure a first end of the stator to the outer wall. Each fastener of the first set of fasteners extends through one of the mounting plates, through the stator, and engages the rear internal wall to secure a second end of the stator to the rear internal wall.

A vehicle transmission includes a stator disposed within a transmission housing. A first longitudinal end of the stator is secured to an internal wall within the housing via a first plurality of fasteners that extend through the stator from a second longitudinal end to the first longitudinal end. The second longitudinal end of the stator is secured to an outer wall of the housing via a plurality of mounting plates.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
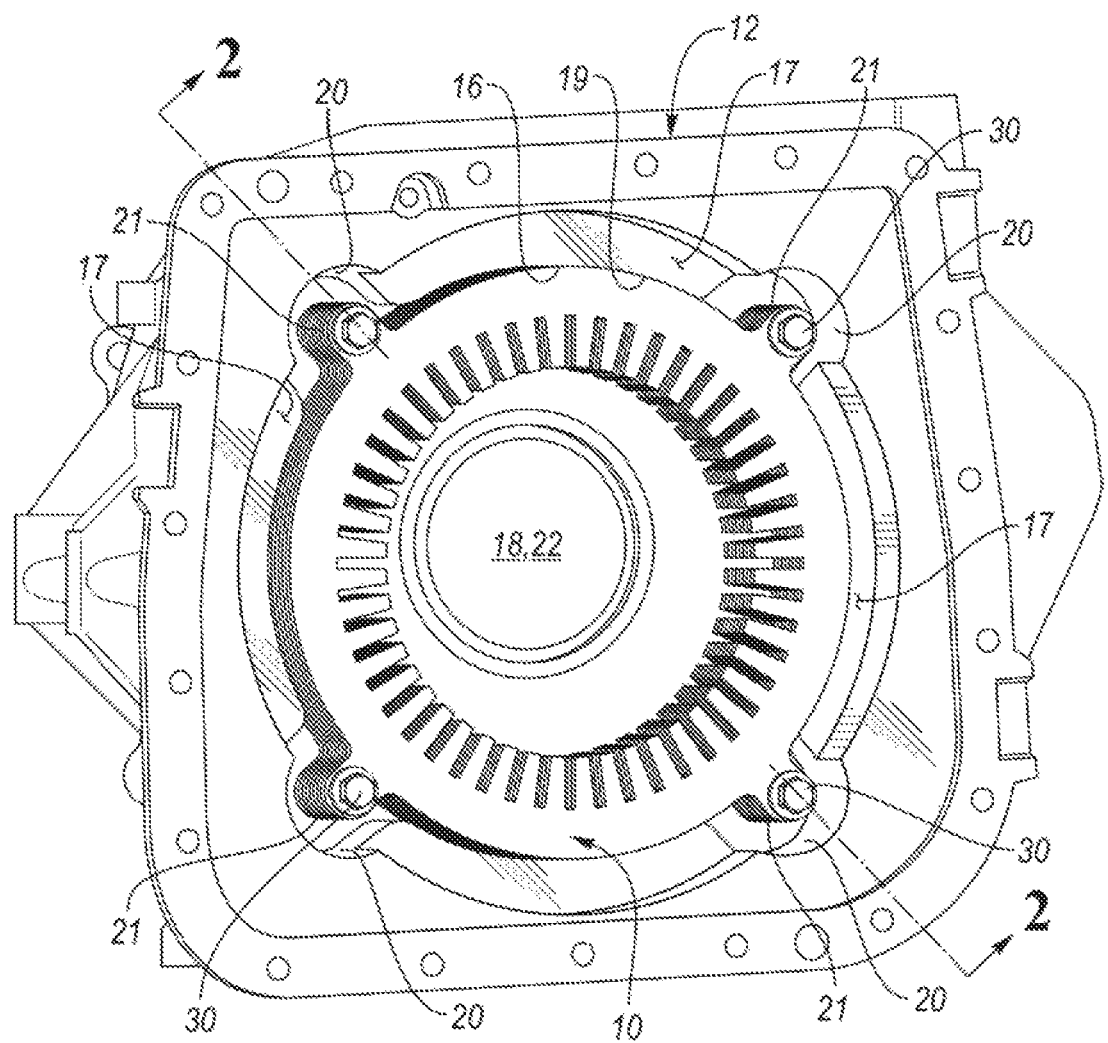
FIG. 1 is a front isometric view of an electric machine stator that is disposed within a housing illustrating a first mounting arrangement for the electric machine stator.
Figure 2:
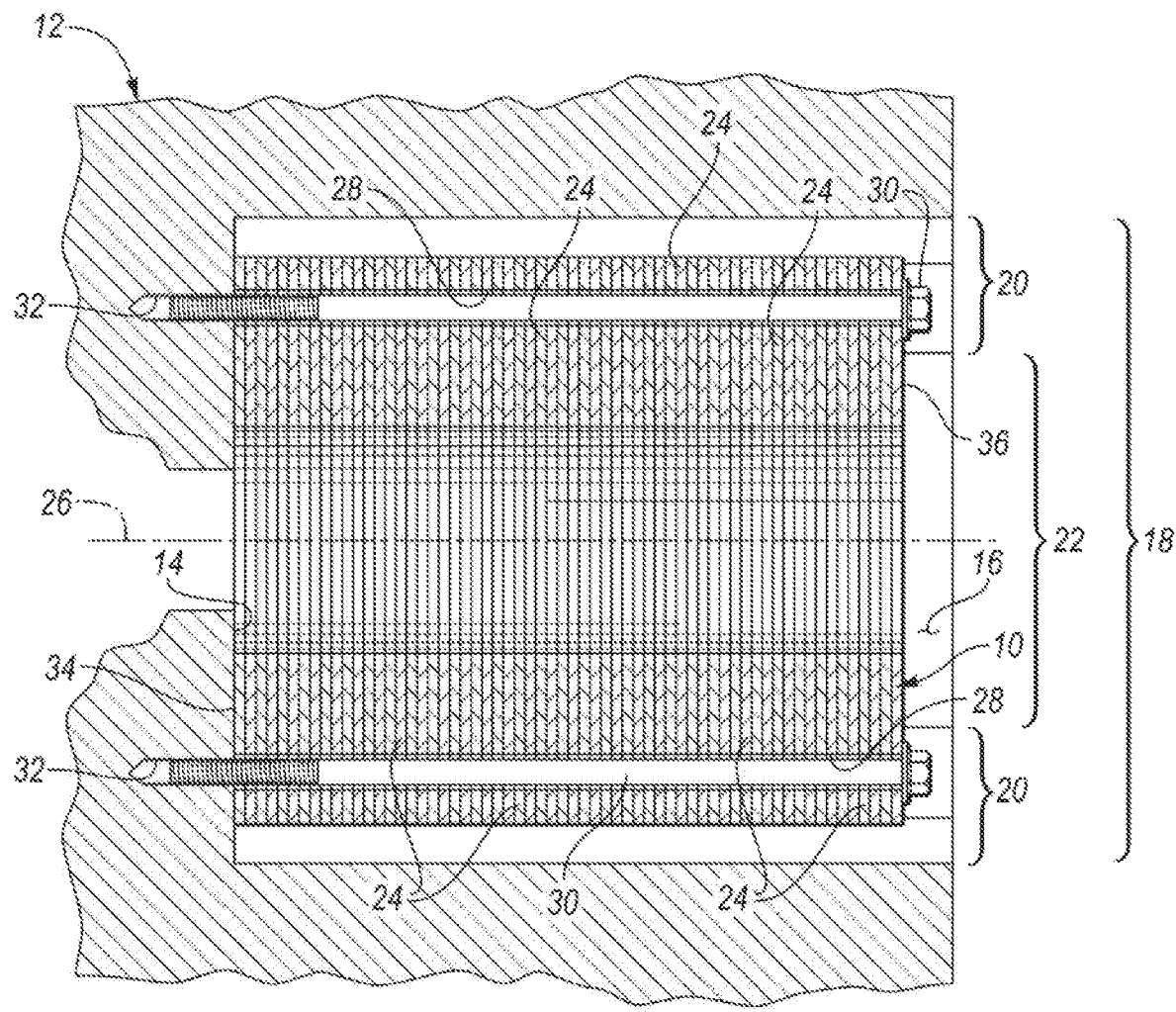
FIG. 2 is a cross-sectional view taken alone line 2-2 in FIG. 1.

Referring to FIGS. 1 and 2, a front isometric view of an electric machine stator 10 that is disposed within a housing 12 and a cross-sectional view taken along line 2-2 in FIG. 1 are illustrated, respectively. More specifically, FIGS. 1 and 2 illustrate a first and/or conventional mounting arrangement for the electric machine stator 10.

The electric machine stator 10 and the housing 12 may be subcomponents of a vehicle. More specifically, the electric machine stator 10 and the housing 12 may be subcomponents of a vehicle powertrain that is configured to deliver power to wheels to propel the vehicle. The housing 12 may be a transmission or transaxle housing that contains transmission and/or transaxle components such as gear sets, clutches, brakes, differentials, driveshafts, half shafts, etc. The gear sets may be selectively placed in different gear ratios by selective engagement of friction elements, such as the clutches and brakes, to establish desired multiple discrete or step drive ratios.

The electric machine stator 10 may be the stator of an electric machine that includes both a stator and a rotor. The electric machine may draw power from a battery and operate as a motor to provide a driving force for the powertrain of the vehicle. Alternatively, the electric machine may operate as a generator and convert kinetic energy from the powertrain of the vehicle into electric energy to be stored in the battery or to power other electrical components within the vehicle. If the vehicle is a hybrid vehicle that includes an additional power source, such as an internal combustion engine, the electric machine may operate as a generator while the other power source is providing propulsion power for the vehicle, for example. The electric machine may additionally operate as a generator during times of regenerative braking in which torque and rotational energy or power from spinning drive wheels of the vehicle is transferred back through the powertrain and to the electric machine, which then converts the rotational energy into electrical energy, which may then be stored within the battery or to power other electrical components within the vehicle.

In the first and/or conventional mounting arrangement for the electric machine stator 10, the housing 12 includes an internal rear wall 14 and an internal side wall 16 that define a cavity 18. The internal rear wall 14 and the internal side wall 16 may be referred to as the first and second internal walls, respectively, or vice versa. The internal side wall 16 and an outer wall 17 may also define an access opening 19 to the cavity 18. More specifically, the outer wall 17 may be disposed around the opening 19 while the internal side wall is disposed within the opening 19 and the cavity 18. The access opening 19 may be defined on an opposing (i.e., opposite) side of the housing 12 relative to the internal rear wall 14. The outer wall 17 may be an outer wall with respect to the cavity 18. FIG. 1, however, depicts the housing 12 with an outer cover removed. Once the outer cover is placed onto the housing 12, the outer wall may become internal relative to the housing 12 and cover as a whole. The internal rear wall 14 and the outer wall 17 may be disposed on opposing (i.e., opposite) sides of the housing 12 and opposing (i.e., opposite) sides of the cavity 18. The internal rear wall 14 and the outer wall 17 may be substantially parallel to each other. Substantially parallel may include any incremental between exactly parallel and plus or minus 10° from exactly parallel. The electric machine stator 10 may be disposed within the cavity 18 between the internal rear wall 14 and the access opening 19.

The internal rear wall 14 may be a flat and substantially planar wall while the internal side wall 16 may be cylindrical in shape. Substantially planar may include a flat surface that ranges from a perfectly flat along a designated flat plane to a flat surface that includes deviations of up to 3 mm from such a designated flat plane. The internal rear wall 14 and the internal side wall 16 may be substantially perpendicular to each other. Substantially perpendicular may include any incremental value between 800 and 100°. The cavity 18 may also include lobes 20 that extend radially outward from a central portion 22 of the cavity 18. The lobes 20 may be defined by the internal side wall 16. The lobes 20 provide clearance for radially outward extending protrusions 21 of the electric machine stator 10 that define through holes that are configured to received fasteners (see 28 and 30 below).

The electric machine stator 10 may be comprised of a plurality of laminate plates 24 that are sequentially stacked in an axial direction along an axis of rotation 26 of the rotor (not shown) of the electric machine. The laminate plates 24 are individually fabricated from a material such iron or steel. The laminate plates 24 are then aligned in an axial direction along the axis of rotation 26 to form the core of the electric machine stator 10. The electric machine stator 10 also includes coil windings that are not depicted in the Figures for simplicity purposes. The laminate plates 24 may be stacked "loose", welded, or bonded together depending the desired application. The laminate plates 24 may include a thin layer of insulating material (e.g., a thin layer of epoxy that is approximately 0.001 mm thick). Although not depicted in FIGS. 1 and 2, there may be small spaces between adjacent laminate plates 24 at locations where the adjacent laminate plates 24 are not affixed to each other, if the application requires the adjacent laminate plates 24 to be affixed to each other (i.e., via welding or bonding).

The laminate plates 24 of the electric machine stator 10 may define a plurality of through holes 28 that are each configured to receive one of a first plurality (or first set) of fasteners 30. More specifically, the through holes 28 may be defined by the outwardly extending protrusions 21 of the electric machine stator 10. The internal rear wall 14 of the housing 12 may define a first plurality (or first set) of tapped holes 32 that are each configured to align with one of the plurality of through holes 28 and engage the one of the fasteners 30. More specifically, each of the fasteners 30 may extend through one of the through holes 28 and engage one of the tapped holes of the first plurality of tapped holes 32 to secure the electric machine stator 10 to the housing 12 and within the cavity 18. The fasteners 30 may also function to properly align the plurality of laminate plates 24 to form the core of the electric machine stator 10 if the application requires the adjacent laminate plates 24 to be stacked in a "loose" configuration.

In the first and/or conventional mounting arrangement for the electric machine stator 10 depicted in FIGS. 1 and 2, the fasteners 30 secure the electric machine stator 10 to the housing 12 and within the cavity 18 in cantilevered fashion (i.e., a first longitudinal end 34 of the electric machine stator 10 along the axis of rotation 26 is secured to the housing 12 while a second longitudinal end 36 of the electric machine stator 10 along the axis of rotation 26 is not secured to any static component that is grounded or anchored to the housing 12), which may lead to undesirable noise, vibration, or harshness (NVH) issues. Therefore, in order reduce or eliminate any undesirable NVH issues, it may be desirable to support the electric machine stator 10 on both longitudinal ends 34, 36 to increase the stiffness of the electric machine stator 10, which in turn will reduce or eliminate any undesirable NVH issues. It is also desirable to ensure that there is no additional stress is induced within the core of the electric machine stator 10 as a result of adding a mechanism that mounts both ends of the electric machine stator 10 to the housing 12. Insufficient stiffness will result in undesired noise and vibrations, while additional stress on the core of the electric machine stator 10 will result in core losses, which in turn reduces the efficiency of the electric machine. Reduced efficiency decreases the range that electric or hybrid vehicles may utilize the electric machine for propulsion and decreases the fuel economy in hybrid vehicles that utilize the electric machine for propulsion.

Figure 3:
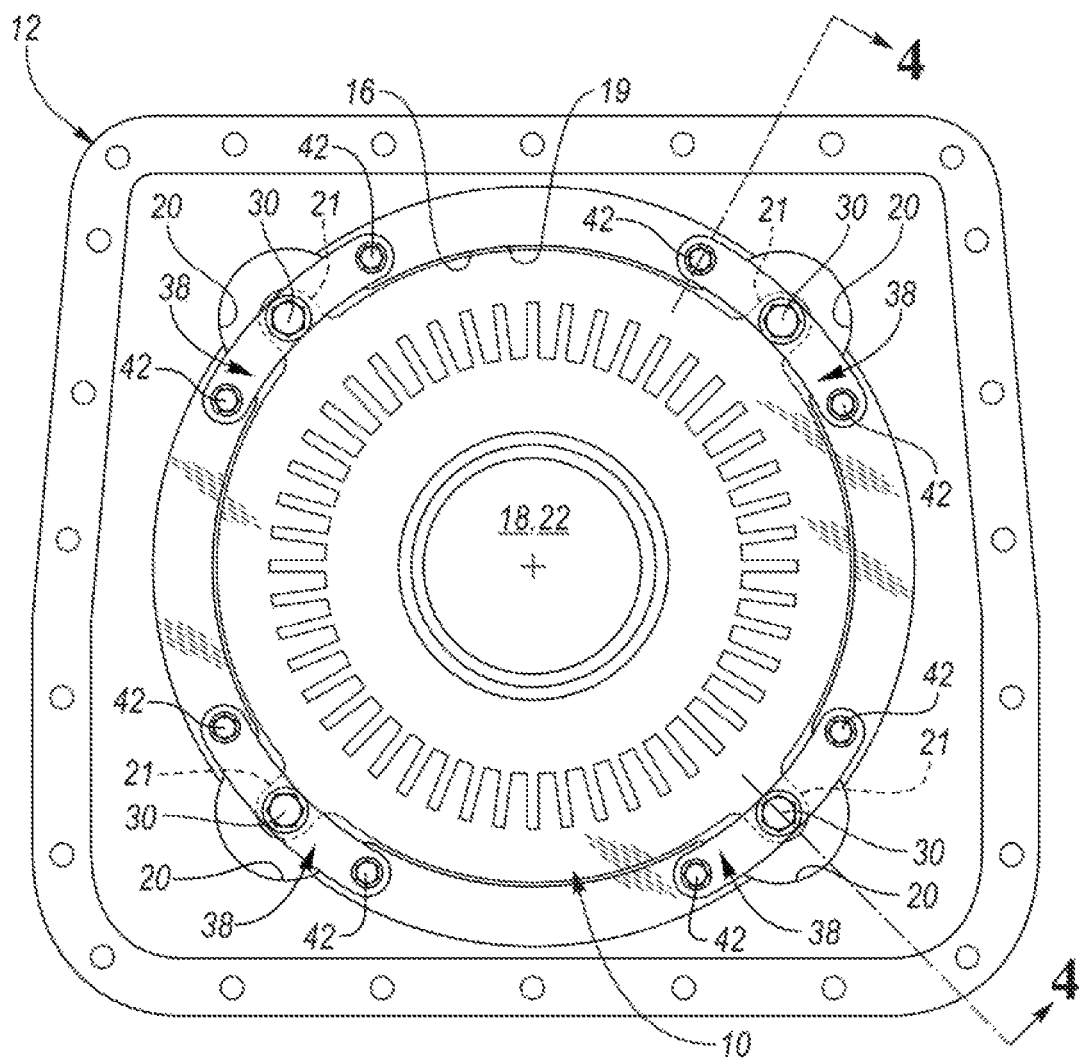
FIG. 3 is a front view of the electric machine stator that is disposed within the housing illustrating a second mounting arrangement for the electric machine stator.
Figure 4:
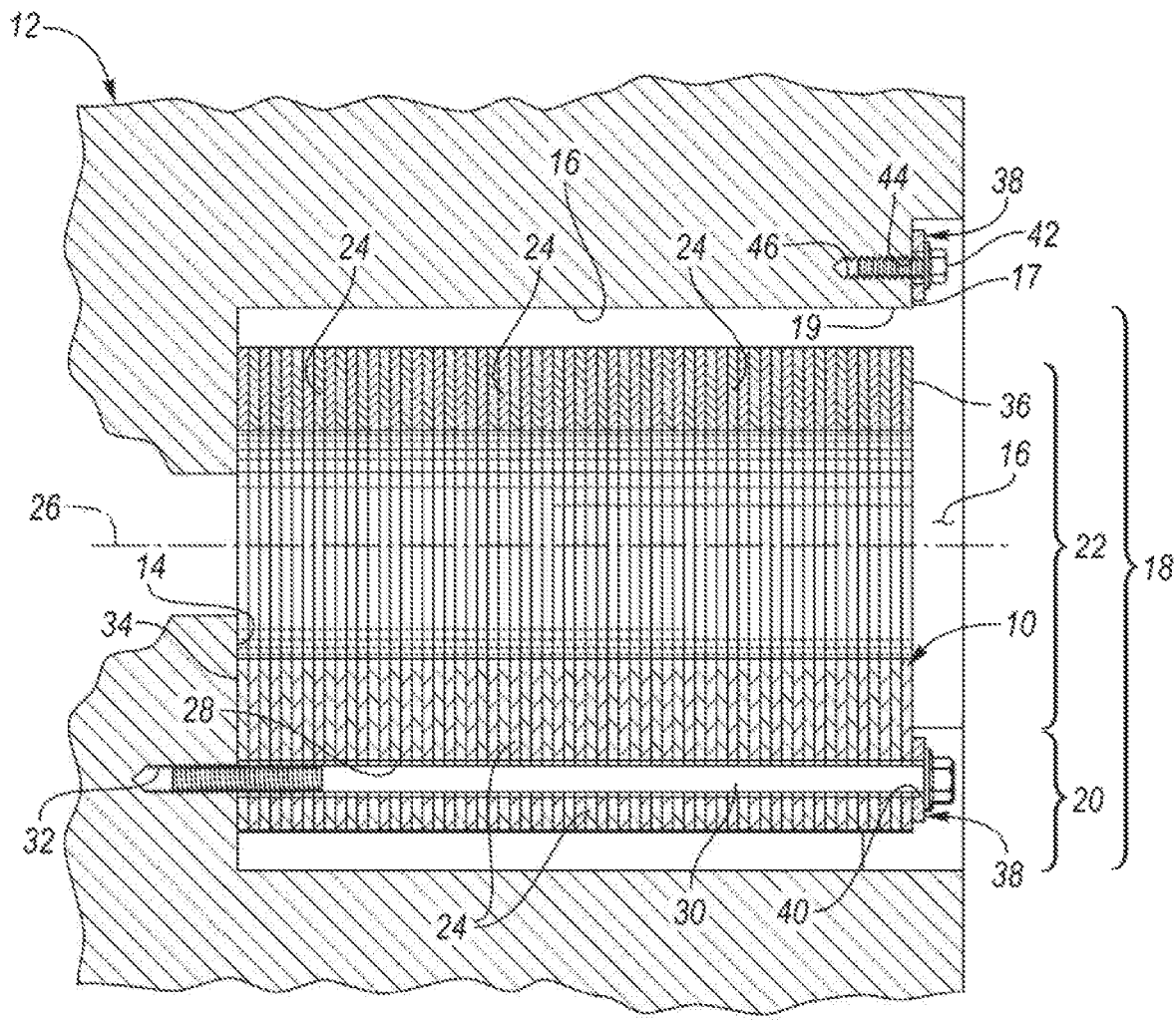
FIG. 4 is a cross-sectional view taken alone line 4-4 in FIG. 3.

Referring to FIGS. 3 and 4, a front view of the electric machine stator 10 that is disposed within the housing 12 and a cross-sectional view taken along line 4-4 in FIG. 3 are illustrated, respectively. More specifically, FIGS. 3 and 4 illustrate a second mounting arrangement for the electric machine stator 10, where the electric machine stator 10 is supported on both the longitudinal ends 34, 36 for the purpose of increasing stiffness to reduce or eliminate potential NVH issues. The second mounting arrangement depicted in FIGS. 3 and 4 also does not induce addition stress on the core of the electric machine stator 10 since the same number of fasteners 30 are utilized to secure the electric machine stator 10 to the housing 12 with respect to the first and/or conventional mounting arrangement, resulting in no additional compressive stress on the core of the electric machine stator 10. It should be understood that the components depicted in FIGS. 3 and 4 that were also depicted in FIGS. 1 and 2 will have the same properties, characteristics, functionality, etc. unless otherwise specifically stated herein.

In the second mounting arrangement for the electric machine stator 10, a plurality of mounting plates 38 secure the second longitudinal end 36 of the stator 10 to the housing 12 proximate to or adjacent to (e.g., next to) the access opening 19. The plurality of mounting plates 38 may engage and may be secured more specifically to the outer wall 17 of the housing 12. The electric machine stator 10 is disposed between the between the plurality of mounting plates 38 and the internal rear wall 14 of the housing 12. The first longitudinal end 34 of the electric machine stator 10 may engage and/or may be secured to the internal rear wall 14 of the housing 12.

Each of the fasteners of the first plurality (or first set) of fasteners 30 extends through one of the plurality of mounting plates 38, through the electric machine stator 10, and engages the second internal wall 14 of the housing 12 to secure the electric machine stator 10 to the housing 12 and within the cavity 18, and to secure the electric machine stator to one of the plurality of mounting plates 38. Each of the plurality of mounting plates 38 may define a first through hole 40. Each through hole 40 is configured to align with one of the plurality of through holes 28 defined in the laminate plates 24 of the electric machine stator 10, and to align with one hole of the first plurality of tapped holes 32 defined in the rear wall 14 of the housing 12. Each of the fasteners of the first plurality (or first set) of fasteners 30 may extend through one of the through holes 40, one of the through holes 28, and engage one of the tapped holes 32 to secure the electric machine stator 10 to the housing 12 and within the cavity 18, and to secure the electric machine stator to one of the plurality of mounting plates 38. More specifically, each fastener of the first plurality (or first set) of fasteners 30 may secure the electric machine stator 10 to both the rear wall 14 of the housing 12 and to one of the plurality of mounting plates 38 such that the electric machine stator 10 is "sandwiched" between the rear wall 14 of the housing 12 and the plurality of mounting plates 38 and such that the electric machine stator 10 is supported at both the first longitudinal end 34 and the second longitudinal end 36. The electric machine stator 10 is supported along the second longitudinal end 36 since the plurality of mounting plates 38 are secured to the housing 12. Supporting the second longitudinal end 36 of the stator 10 via the plurality of mounting plates 38, along with supporting the first longitudinal end 34 of the stator 10, prevents radial movement of the second longitudinal end 36 of the electric machine stator 10 relative to the housing 12, which reduces or eliminates any NVH issues that may be produced when the electric machine stator 10 is only supported along the first longitudinal end 34 in a cantilevered manner.

The plurality of mounting plates 38 may be secured to the housing 12 by a second plurality (or second set) of fasteners 42. More specifically, each mounting plate 38 may be secured to the outer wall 17 of the housing 12 by a pair of fasteners of the second plurality (or second set) of fasteners 42, where each of the pairs of fasteners extend through one of the mounting plates 38 and engage the outer wall 17 of the housing 12 to secure the second longitudinal end 36 of the stator 10 to the housing 12 proximate or adjacent (e.g., next) to the access opening 19. The fasteners of each pair of second plurality (or second set) of fasteners 42 may straddle one fastener of the first plurality (or first set) of fasteners 30 along each mounting plate 38. Each of the mounting plates 38 may define a pair of through holes 44 and the outer wall 17 may define a second plurality (or second set) of tapped holes 46. Each of the fasteners of the second plurality of fasteners 42 may extend through one hole of the pairs of through holes 44 and may engage one tapped hole of the second set of tapped holes 46 to secure each of the mounting plates 38 and the second longitudinal end 36 of the stator 10 to the housing 12.

In the second mounting arrangement, the first longitudinal end 34 of the electric machine stator 10 is anchored or grounded to the housing 12 via the fasteners 30 while the second longitudinal end 36 of the electric machine stator 10 is anchored or grounded to the housing 12 via the fasteners 30 and the plurality of mounting plates 38. Such a configuration, where both longitudinal ends 34, 36 of the electric machine stator 10 are anchored or grounded to the housing 12 eliminates or reduces the NVH issues that may arise when compared to anchoring or grounding the electric machine stator 10 to the housing 12 in a cantilevered fashion as depicted in FIGS. 1 and 2.

It should be understood that the designations of first, second, third, fourth, etc. for longitudinal ends of the stator, internal walls, through holes, tapped holes, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle transaxle comprising:
    a housing having internal walls that define a cavity and an access opening to the cavity;
    an electric machine stator disposed within the cavity between a first of the internal walls and the opening, the stator having a plurality of protrusions that extend radially outward;
    a plurality of mounting plates securing a first longitudinal end of the stator to the housing proximate the opening;
    a first set of fasteners, each extending through one of the mounting plates and the stator and engaging the first of the internal walls to secure a second longitudinal end of the stator to the first of the internal walls, wherein each of the fasteners of the first set of fasteners extends through one of the protrusions; and
    a second set of fasteners, wherein pairs of the second set of fasteners extend through one of the mounting plates and engage an outer wall of the housing to secure the first longitudinal end of the stator to the housing proximate the opening.

2. The vehicle transaxle of claim 1, wherein the outer wall of the housing is disposed around the opening and is substantially perpendicular to the first of the internal walls.

3. The vehicle transaxle of claim 1, wherein the fasteners of each pair of the second set of fasteners straddle one fastener of the first set of fasteners along each mounting plate.

4. The vehicle transaxle of claim 1, wherein each of the mounting plates define a first through hole, each of the protrusions define a second through hole, and the first of the internal walls defines a first set of tapped holes, and wherein each of the fasteners of the first set of fasteners extends through one of the first through holes, through one of the second through holes, and engages one tapped hole of the first set of tapped holes to secure the second longitudinal end of the stator to the first of the internal walls.

5. The vehicle transaxle of claim 4, wherein each of the mounting plates define a pair of through holes and the outer wall defines a second set of tapped holes, and wherein each of the fasteners of the second set of fasteners extends through one hole of the pairs of through holes and engages one tapped hole of the second set of tapped holes to secure the first longitudinal end of the stator to the housing.

6. A vehicle transmission comprising:
    a housing having internal rear and side walls that define a cavity and an outer wall that defines an opening to the cavity;

a stator disposed within the cavity and having a plurality of protrusions that extend radially outward;

mounting plates securing a first end of the stator to the outer wall;

a first set of fasteners, each extending through one of the mounting plates and the stator and engaging the rear internal wall to secure a second end of the stator to the rear internal wall, wherein each of the fasteners of the first set of fasteners extends through one of the protrusions; and a second set of fasteners, wherein pairs of the second set of fasteners extend through one of the mounting plates and engage the outer wall to secure the first end of the stator to the outer wall.

7. The vehicle transmission of claim 6, wherein the outer wall of the housing is disposed around the opening and is substantially perpendicular to the internal rear wall.

8. The vehicle transmission of claim 6, wherein the fasteners of each pair of the second set of fasteners straddle one fastener of the first set of fasteners along each mounting plate.

9. The vehicle transmission of claim 6, wherein each of the mounting plates define a first through hole, each of the protrusions define a second through hole, and the rear internal wall defines a first set of tapped holes, and wherein each of the fasteners of the first set of fasteners extends through one of the first through holes, through one of the second through holes, and engages one tapped hole of the first set of tapped holes to secure the second and of the stator to the rear internal wall.

10. The vehicle transmission of claim 9, wherein each of the mounting plates define a pair of through holes and the outer wall defines a second set of tapped holes, and wherein each of the fasteners of the second set of fasteners extends through one hole of the pairs of through holes and engages one tapped hole of the second set of tapped holes to secure the first end of the stator to the outer wall.

11. A vehicle transmission comprising:

a stator disposed within a transmission housing, wherein a first longitudinal end of the stator is secured to an internal wall within the housing via a first plurality of fasteners that extend through the stator from a second longitudinal end to the first longitudinal end, and wherein the second longitudinal end of the stator is secured to an outer wall of the housing via a plurality of mounting plates, wherein the stator has a plurality of protrusions that extend radially outward, wherein each of the fasteners of the first plurality of fasteners extends through one of the mounting plates and one of the protrusions; and a second plurality of fasteners, wherein pairs of the second plurality of fasteners extend through one of the mounting plates and engage the outer wall to secure the second longitudinal end of the stator to the outer wall.

12. The vehicle transmission of claim 11, wherein the fasteners of each pair of the second plurality of fasteners straddle one fastener of the first plurality of fasteners along each mounting plate.

13. The vehicle transaxle of claim 11, wherein each of the mounting plates define a first through hole, each of the protrusions define a second through hole, and the internal wall defines a first plurality of tapped holes, and wherein each of the fasteners of the first plurality of fasteners extends through one of the first through holes, through one of the second through holes, and engages one tapped hole of the first plurality of tapped holes to secure the first longitudinal end of the stator to the internal wall.

14. The vehicle transmission of claim 13, wherein each of the mounting plates define a pair of through holes and the outer wall defines a second plurality of tapped holes, and wherein each of the fasteners of the second plurality of fasteners extends through one hole of the pairs of through holes and engages one tapped hole of the second plurality of tapped holes to secure the first end of the stator to outer wall.

* * * * *